United States Patent [19]

Camras

[11] 4,266,255
[45] May 5, 1981

[54] CAPSTAN DRIVE SYSTEM FOR DRIVING TAPE RECORD MEDIA, AND HAVING INTERNALLY MOUNTED TRANSDUCER HEAD MEANS

[75] Inventor: Marvin Camras, Glencoe, Ill.

[73] Assignee: IIT Research Institute, Chicago, Ill.

[21] Appl. No.: 900,078

[22] Filed: Apr. 26, 1978

[51] Int. Cl.³ .................. G11B 15/60; G11B 15/64
[52] U.S. Cl. .................. 360/90; 360/130.24; 360/130.31
[58] Field of Search .......... 360/90, 104, 102, 130, 360/85, 95, 130.31, 130.32, 130.24

[56] References Cited

U.S. PATENT DOCUMENTS

| | | | |
|---|---|---|---|
| 2,735,900 | 2/1956 | Wohlrab | 360/90 |
| 2,747,025 | 5/1956 | Selsted | 360/130.31 |
| 3,418,434 | 12/1968 | Groenewegen | 360/130 |
| 3,441,187 | 4/1969 | Tueter | 360/90 |
| 3,443,039 | 5/1969 | Bygdnes | 360/130 |
| 3,625,076 | 12/1971 | Yamada | 360/130 |
| 3,688,956 | 9/1972 | Kjos | 360/90 |
| 3,981,024 | 9/1976 | Mo | 360/130 |
| 4,054,929 | 10/1977 | Levy | 360/90 |

FOREIGN PATENT DOCUMENTS

1474403  8/1969  Fed. Rep. of Germany ...... 360/130.24

Primary Examiner—John H. Wolff
Attorney, Agent, or Firm—Hill, Van Santen, Steadman, Chiara & Simpson

[57] ABSTRACT

A capstan having one or more annular slots with transducer heads therein for scanning of respective channels of a tape record medium, preferably with a vacuum source coupled with the slot or slots and for example an insert shaped to break the vacuum at a tape release position of the slot. A capstan pressure roller if used may be relieved at the groove or grooves and at locations corresponding to the edges of the tape path about the capstan.

8 Claims, 19 Drawing Figures

CAPSTAN DRIVE SYSTEM FOR DRIVING TAPE RECORD MEDIA, AND HAVING INTERNALLY MOUNTED TRANSDUCER HEAD MEANS

CROSS REFERENCE TO RELATED APPLICATIONS

Reference is made to my pending application Ser. No. 573,555 filed May 1, 1975 and to application Ser. No. 346,869 filed Apr. 2, 1973, now U.S. Pat. No. 4,020,999 issued May 3, 1977.

BACKGROUND OF THE INVENTION

Many efforts have been made in the past to record television signals along longitudinal channels of a tape record medium. Such an approach holds the promise of a more compact transport which can be conveniently housed as an integral part of a broadcast television receiver for the home. With an endless loop cartridge, for example, such a system would be extremely desirable. A problem has been to achieve a flutter free high speed transducer system which is of the requisite simplicity and economy and which is compatible with a compact and reliable cartridge-loaded system.

In the field of data recording also, a simplification in the transport system without sacrifice of drive stability would be important. Elimination of drive rollers increases useful tape life as well as the reliability and life of the tape transport mechanism.

SUMMARY OF THE INVENTION

This invention relates to a tape transducer system and particularly to a magnetic tape transducer system suitable for transducing signals along longitudinal channels by means of longitudinal scan transducing, using non-rotating transducer heads.

It is an object of the invention to provide a tape transducer system having the desirable characteristics described in the preceding section, while providing improved head wear characteristics.

It is another object of the invention to provide such a tape transducer system with improved head-tape contact for high resolution and freedom from dropouts.

Another object of the invention is to provide a tape transport and scanning arrangement meeting the goals of the previous section and which provides for very high stability of tape motion and which facilitates rapid starting and stopping of such tape motion.

A feature of the invention resides in the provision of a tape transducer system suitable for use with endless loop video tape cartridges. An especially advantageous arrangement of such a video cartridge transducer system enables the elimination of drive rollers, greatly simplifying such a system.

A further feature relates to a specialized pressure roller for use with the capstan drive assembly, the pressure roller being relieved at the tape margins to greatly improve the operating life of a high speed video tape cartridge.

Other objects, features and advantages of the invention will be apparent from the following detailed description taken in connection with the accompanying drawings.

DESCRIPTION OF THE PREFERRED EMBODIMENTS

Figures 1, 2, 3, 4, 5, 6:
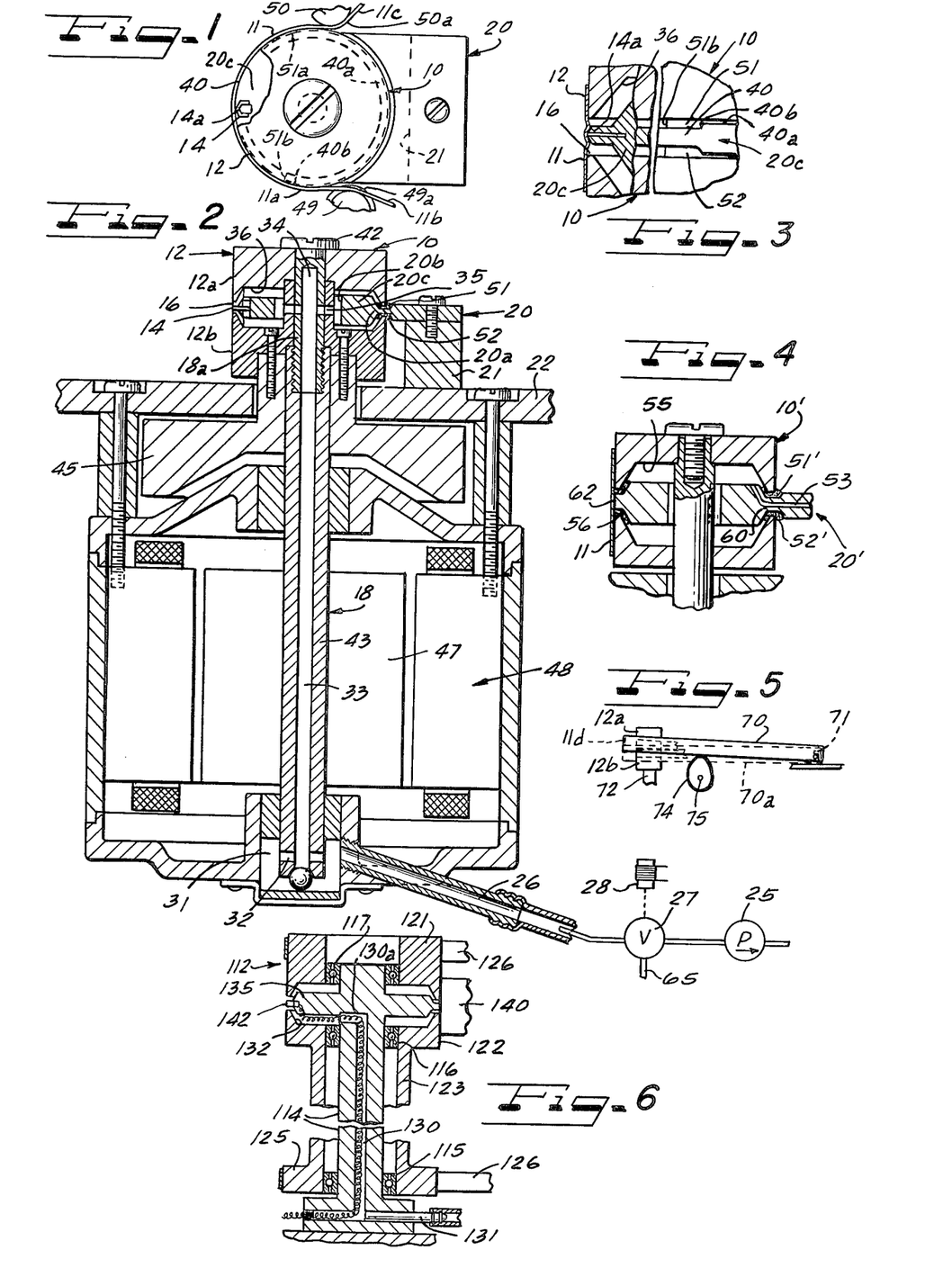
FIG. 1 is a somewhat diagrammatic top plan view of an embodiment of a tape transducer system in accordance with the present invention.
FIG. 2 is a somewhat diagrammatic vertical sectional view of the transducer system of FIG. 1.
FIG. 3 is a partial enlarged somewhat diagrammatic vertical sectional view of the apparatus of FIGS. 1 and 2, showing details of construction.
FIG. 4 is a somewhat diagrammatic vertical sectional view illustrating a modified tape transducer system in accordance with the present invention.
FIG. 5 is a partial diagrammatic elevational view illustrating a system for indexing of the tape to present successive channels to the transducer head for any of the embodiments herein.
FIG. 6 is a partial somewhat diagrammatic vertical sectional view illustrating a further modification of the invention.

FIG. 1 is a plan view of a tape transducer system comprising a capstan 10 with a magnetic record tape 11 extending along a tape path so as to be in contact with the capstan surface 12, FIG. 2, preferably over about 180°. The tape 11 may be a part of an endless loop including a coil of tape all within a tape cartridge (such as illustrated in my U.S. Pat. No. 4,020,999) which receives the capstan 10 into the interior of the cartridge for scanning of the tape at a video transducing speed by means of a longitudinal scan magnetic transducer head such as diagrammatically indicated at 14, FIGS. 1 and 2. By way of example, the magnetic transducer head may use a ferrite core having similar dimensions to the metal head shown in U.S. Pat. No. 3,725,608 issued Apr. 3, 1973; or a metal head may be used constructed as described in detail in my U.S. Pat. No. 3,534,177 issued Oct. 13, 1970. The confronting poles and intervening coupling gap region of the transducer head comprise a transducer head coupling means for scanning engagement with the record tape at the capstan surface 12 as diagrammatically indicated at 14a in FIG. 3 where a lower than atmospheric pressure is maintained within the capstan. In any case the pole region 14a of the head is maintained in sliding pressure engagement with the inner magnetizable surface of the record medium, the coupling gap having a longitudinal dimension of the order of 0.6 micron with the confronting poles of the transducer head being longitudinally offset along the longitudinal path of the record medium which may be moving at a video transducing speed of at least about thirty inches per second. In the absence of a vacuum source for maintaining head-tape engagement, the head poles 14a may protrude slightly beyond the capstan surface 12, and tape tension may be produced as described in U.S. Pat. No. 3,725,608.

As best seen in FIG. 2, the capstan 10 is provided with an annular slot 16 which divides the capstan surface into annular surface portions 12a and 12b. Capstan 10 has a capstan shaft 18 secured with the respective sections of the capstan so as to drive the capstan at the desired rotational rate and so as to impart to the tape a linear speed relative to transducer head 14 corresponding to the speed of capstan surface 12. A head support 20 is shown as having an external part fixed to a post 21 on the frame 22 of the transducer machine. A reduced cross section portion 20a extends through the slot 16 at one side of the capstan and is secured with the transducer head 14 at an opposite side of the capstan, the support, for example, having a circular central aperture 20b receiving capstan shaft section 18a therethrough and providing clearance for rotation of the shaft section.

In FIG. 2, a vacuum source such as pump 25 is shown as being connected with a duct 26 via a shutoff valve 27 operated by means of an electrical solenoid 28. (A vacuum gage, filter, trap for foreign matter, and other elements may be included but are not shown for simplicity.) With valve 27 opened, a vacuum is established within duct 26 and within the connecting passages 31–35 leading to chamber 36 within the capstan 12. This vacuum means produces a relatively low pressure at the inner side of the tape path extending about the capstan 12 so as to hold the tape in driven contact with the surfaces 12a and 12b of the capstan. By the provision of a vacuum connection to the interior space 36 of the capstan, capstan pressure rollers such as illustrated in U.S. Pat. No. 4,020,999 may be omitted, greatly simplifying the transport mechanism. As illustrated in FIG. 2, the head support 20 may include a relatively massive annular body 20c which supports the head 14. The body 20c may be provided with a circumferential flange as indicated at 40 in FIGS. 1 and 3 which extends into the annular slot 16 of the capstan 10 so as to restrict the air path therethrough. The flange 40 may extend for 360° about the body 20c and may have increased axial extent as indicated at 40a in FIG. 3 so as to provide stationary slot obstructing means except where firm driving engagement with capstan surface 12 is to be established.

As shown in FIG. 2, the sections of capstan 12 are secured together by means of the externally threaded element 42 which is threadedly engaged with the motor shaft section 43 of the capstan shaft 18. The lower section of the capstan 12 providing surface 12b is secured with a flywheel element 45 of relatively great mass which thus serves to give uniform capstan rotation. Motor shaft section 43 is secured with rotor 47 of motor 48 which serves to drive the capstan 12 at a rotational rate corresponding to the desired video transducing speed relative to head 14.

Referring to FIG. 1, the enlarged width portion 40a of flange 40 may terminate as indicated at 40b substantially beyond the point where the record tape 11 is mechanically moved into engagement with the capstan surface 12 by virtue of the positioning of tape guide 49. Furthermore, in a preferred arrangement, a filler of fibrous material 51, 52 is arranged on the upper and lower sides of the flange 40 over an arcuate extent generally corresponding to the arcuate extent of the flange 40a. The fibrous material such as paper 51, 52 can provide an effective seal to prevent leakage of the vacuum at parts of the flange 40 not covered by the tape, and also at the region of the tape path indicated at 11a somewhat beyond the point where firm contact of the tape with the capstan surface 12a is first established by virtue of the guide arrangement including guide post 49. Paper has been found to give a good seal and to have the desirable low coefficient of friction which enables free rotation of the capstan parts in sliding contact with the upper and lower surfaces of the seals 51 and 52. The paper may be adhered to the flange 40 in a thickness initially greater than the clearance space and allowed to run in so that the upper and lower lips of the capstan wear a furrow into the paper. Other materials such as teflon, felt, nylon, or even metallic bearing materials can be used. Alternatively the axial extent of flange 40a, FIG. 3, may be such that a microscopic unfilled gap is left between the "sealed" portions over the extent of flange 40a.

By way of example, for a capstan diameter of 1.27 inch it has been found that the seals 51, 52 should be located at a region 11a of the tape path which subtends an angle of about 10° beyond the point where tape 11 first contacts the capstan. The absence of a vacuum as the tape first engages with the capstan as the path region 11a prevents flutter effects, and has been found to enable a much steadier and more reliable tape movement.

At the side of the capstan where the tape leaves contact with the capstan surface 12 by virtue of the positioning of tape guide 50, it is merely necessary that the paper seal 51, 52 be present at a region such as indicated at 51a preferably before the point where it is desired that the tape leave contact with the capstan surface. In a particular embodiment which has actually been operated the edge 51b of paper 51 actually extended beyond the end 40b of the enlarged portion of the flange 40a as indicated in FIG. 3.

In a second embodiment as shown in FIG. 4, a vacuum passage 53 is provided interiorly of a support 20′ corresponding to support 20 of FIG. 2. The passage 53 is connected to a vacuum source external to the capstan and communicates with an interior space 55 within the capstan so as to produce a relatively low pressure at the inner side of the tape path extending about the capstan as in the embodiment of FIG. 2. The head support member 20' may include a flange corresponding to that shown at 40, 40a in FIG. 3 and extending within the slot 56. At the side of the capstan where the tape is released from the capstan, the flange corresponding to flange 40a is shaped to break the vacuum at the tape release position. Alternatively in each embodiment, positive air pressure can be supplied at the region via a separate air duct within the neck portion such as indicated at 60 in FIG. 4. The flanges such as 40, 40a, FIG. 2 may fill the portion of the slot 56 which is removed from the tape path so as to tend to seal off the interior chamber 55.

In FIG. 4, the section at the left hand side is taken at the side of the capstan which is adjacent the departing tape guide such as indicated at 50 in FIG. 1, the relatively thick flange 62 at the left in FIG. 4 thus corresponding to the flange 40a of FIG. 3. The magnetic transducer head assembly would correspond to the assembly 14 of FIGS. 1-3 and would be arranged diametrically opposite from the passage 53. As shown in FIG. 4, the neck portion 60 and the flange 62 may have an axial extent so as to substantially fill the slot 56 except where the vacuum is to be applied to the tape as in FIGS. 1-3. Thus, flanges such as 40 and 44 in FIGS. 1-3 and flanges such as 62 in FIG. 4 may fill the slot in the capstan surface to various extends on the upstream and downstream side of the tape relative to the transducer head to regulate the holding force desired, analagous to varying the pressure of pinch rollers (from zero to maximum) that otherwise would have been used against the capstan. In general, the holding effect of the vacuum may be concentrated on any desired area along the path where the tape runs over the capstan. The vacuum may be removed, or replaced by air pressure (positive pressure means), for rapid coupling or uncoupling of the tape drive, as with a solenoid operated valve, such as shown at 27, FIG. 2, which has a discharge line 65 to atmosphere which may quickly relieve the vacuum when the solenoid 28 is deenergized. In FIG. 4 the vacuum is introduced into the chamber 55 through the opening 53 in the web 20', the opening being slot shaped to give it substantial cross section area, or alternatively the opening may be a series of holes; or a vacuum duct may even be formed by opening the back of the paper seal. This method of introducing the vacuum through the back of the slit simplifies the shaft and bearings which need not then be hollow. Where the vacuum is to be coupled through gaps in the seals 51', 52' at the region of head support 20' in place of the passage 53, the vacuum line would be formed by rectangular ducts above and below neck portion 60 whose edges confronting the capstan 10' would have seals in conforming sliding engagement with the capstan surface so as to completely enclose such gaps in the seals 51', 52'.

If a vacuum source is used as shown in FIGS. 1-4, the head tip (coupling means) may actually be located inside the capstan, the tape being pulled inside the slit by the vacuum sufficiently to contact the head surface. Or in this case the head tip (coupling means) may advantageously be flush with the capstan surface, or may protrude slightly.

Fillers 51', 52' of fibrous or other sealant material as herein described are shown in association with support 20' in FIG. 4, and can provide an effective seal to prevent leakage of the vacuum at parts of the flange 62 not covered by the tape. As previously mentioned, paper gives a good seal when adhered to the flange in a thickness initially greater than the clearance space and allowed to run in so that the upper and lower lips of the capstan wear a furrow into the paper.

FIG. 5 illustrates a single reel cartridge 70 for containing the tape 11 and for supplying the tape along an incoming tape path 11b past guide 49 and for receiving the tape along a return tape path 11c from guide 50. Cartridges of this type are illustrated in my U.S. Pat. No. 3,725,608 issued Apr. 3, 1973. An improved version of the cartridge is shown in my U.S. Pat. No. 3,849,797 issued Nov. 19, 1974. As explained in connection with the third figure of said Pat. No. 3,849,797, the cartridge 70 in FIG. 5 of the present application may be engaged with fingers such as indicated at 71 at its rear edge so as to be pivotal downwardly over a capstan drive assembly such as indicated at 72. The frame such as 22, FIG. 2, which pivotally supports the cartridge 70 by means of the fingers 71 can be provided with movable arms for supporting the guides 49 and 50, in a manner similar to the support of rollers (26) and (27) as shown in the third figure of said patent. The tape in a threading condition extends across the front of the cartridge as indicated at 11d so as to loop about the capstan drive surfaces 12a, 12b generally as indicated in the prior patent, whereupon the guides 49 and 50 are actuated to the operating position shown in FIG. 1 so as to place the tape 11 in operative engagement with the capstan surfaces 12a, 12b. The guides 49 and 50 may have flanges such as indicated at 49a and 50a guiding the tape laterally so that as the cartridge 70 is pivoted about the fingers 71 between a lower position such as indicated at 70a and an upper position such as indicated at 70, the tape 11 will be shifted from a lower position to an upper position on the capstan drive surfaces 12a, 12b so that the head 14 is in scanning relation to successive different longitudinal channels on the tape. As indicated in FIG. 5, the head indexing relative to the tape can thus be carried out in a very simple manner, for example by means of a cam 74 rotatable to successive angular positions by means of a shaft 75 which may be rotated manually with the use of an indicator dial such as indicated in the nineteenth figure of said U.S. Pat. No. 3,849,797, or automatically successively rotated in a manner analogous to the twelfth and thirteenth figures of said patent.

In operation of the embodiment of FIG. 5, the cartridge shown in the second Figure of my U.S. Pat. No. 3,849,797 is loaded onto the drive mechanism of FIGS. 1-3, for example, in the same manner as described for the loading procedure in the prior patent. As the cartridge 70 is pivoted to an initial lowermost position as indicated at 70a, the tape retaining fingers (132, 133) carried by the cartridge 70 are actuated against spring bias into a retracted position. For purposes of the embodiment of FIG. 5, the arms are locked in the retracted position as the cartridge is progressively raised by means of cam 74 between the initial position 70a and a final position such as indicated in solid outline at 70 in FIG. 5. A separate actuation may cause insertion of the guides 49 and 50 to the relative positions shown in FIG. 1, such movement being analogous to that of rollers (26 and 27) of the prior patent.

The drive mechanism of my U.S. Pat. No. 3,849,797 can be simplified considerably when the vacuum capstan with internal head as shown in FIGS. 1-3 is used. The entire head and drive roll assembly of the prior patent (including components 40, 55, 57 and 70 of the first figure of the prior patent) can be eliminated since the external head and pressure rollers are no longer needed. The fingers (132, 133) carried by the cartridge 70 can each have an additional branching arm radiating from the same pivot, the added branching arms each carrying one of the guides 49, 50 to hold the tape as shown in FIG. 1 when the cartridge is placed on the machine, the guides (132, 133) swinging to positions at each side of the post 21, FIG. 1, during transducing operation, and the guides 49, 50 swinging to positions outside of the respective guides (132 and 133) when the cartridge is removed from the transport mechanism as indicated in the second figure of the prior patent.

FIG. 6 illustrates a further modification of the capstan drive assembly of FIGS. 1-3 wherein the capstan 112 is mounted on a fixed shaft 114 by means of suitable bearings as indicated at 115, 116 and 117. In this embodiment, the capstan comprises two separate parts 121 and 122, the part 122 having an integral drive element 123 which may be driven in any suitable manner. By way of example, a flywheel 125 may be secured for rotation with part 123, and the flywheel may be belt driven as indicated at 126, for example. Alternatively, the section 123 may have a motor armature secured therewith by analogy with the embodiment of FIG. 2.

In the embodiment of FIG. 6, fixed shaft 114 is provided with a central duct 130 which may connect with a vacuum inlet 131 below the flywheel 125. Duct 130 may extend radially as indicated at 130a at the upper end of the fixed shaft 114 and communicate with the interior space 132 to hold the tape against the capstan as in the preceding embodiments. Stationary body 135 may be fixed to the shaft 114 and may have the configuration described with reference to flange 40, 40a in FIG. 3, for example, the body 135 serving to seal chamber 132 except where tape engagement with the perimeter of the capstan is required. Capstan sections 121 and 122 may move at the same rate by means of a drive or bridging roller 140 which serves to drive section 121 from section 122.

As an alternative, roller 140 may itself be driven so as to drive both parts of the capstan assembly 121 and 122 and the stabilizer roller 125 as a unit. As a still further modification, chamber 132 may be at atmospheric pressure, and roller 140 utilized to press the tape into driving engagement with both of the capstan sections 121 and 122, the flywheel 125 being driven by means of belt 126, for example. A further and preferred method for driving the capstan is to have separate drive means for both the top section 121 and bottom section 122. Belts 126, 126a are shown. However each section could be attached to a rotor of its own synchronous motor driven at identical angular velocities thus locking both top and bottom sections so they rotate in unison. With separate drive for each section, the roller 140 may be omitted, the tape being held by vacuum or by friction against the capstan. Drive rollers have generally proved to be detrimental to tape life.

In FIG. 6, where vacuum operation is employed, the magnetic record tape is held against surfaces of parts 121 and 122 with sufficient force so that the magnetic tape will drive part 121 from part 122, and the drive belt 126 may be omitted.

Figure 7:
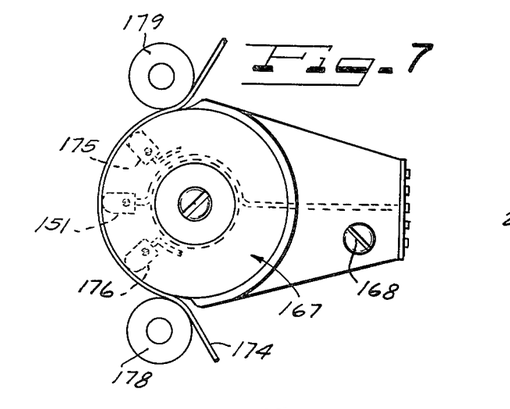
FIG. 7 is a somewhat diagrammatic plan view of a further capstan transducer system in accordance with the present invention.
Figure 8:
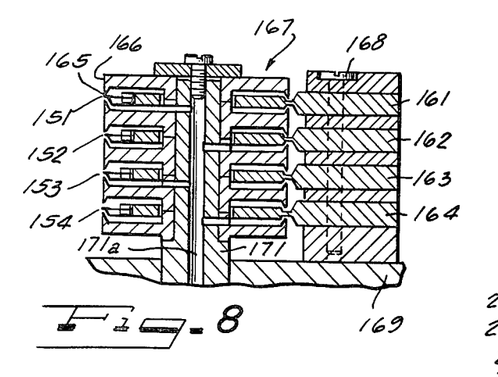
FIG. 8 is a partial somewhat diagrammatic vertical sectional view of the system of FIG. 7.

FIGS. 7 and 8 illustrate a modification of the embodiment of FIGS. 1-3 wherein a series of head units such as 151-154 are carried by respective head supports 161-164 which extend through respective slots 165 of capstan surface 166 of capstan 167. The head supports 161-164 are shown as being fixed by means of a common fastening means 168 which may be secured to the frame 169 of the machine. Capstan shaft 171 is shown as being secured with the capstan 167 so as to produce joint rotation of the various capstan surface portions, making up the capstan surface 166. Tape 174, FIG. 7, may be a magnetic tape record medium in the form of an endless loop including a rotatable coil and all contained within a video cartridge as described with reference to FIGS. 1-5. In this example the tape extends about the capstan 167 for about 180° and is in sliding engagement with each of the head units 151-154. Further head units such as shown at 175 and 176, FIG. 7, may be mounted with each of head units 151-154, so as to serve as individual erase and monitor heads, for example. While the capstan 167 is coupled with a vacuum source via passage 171a as in FIG. 2 so as to produce a low pressure below atmospheric pressure in each of the respective slots thereof, as an alternative the vacuum source may be removed and pressure rollers may be provided having a configuration such as diagrammatically indicated at 178 and 179 in FIG. 7.

Figure 9:
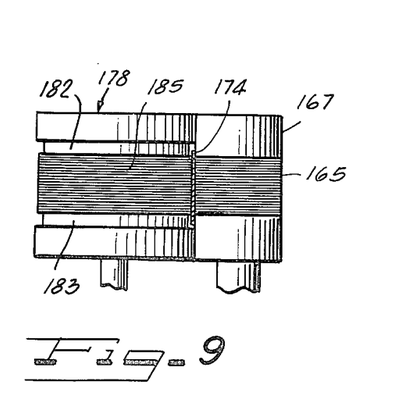
FIG. 9 is a somewhat diagrammatic side elevational view illustrating the relationship of an optional capstan pressure roller to the tape wrapped about a capstan and applicable to any of the embodiments herein.

A preferred configuration of pressure roller 178 is shown in FIG. 9, and may be used with any of the embodiments herein; in FIG. 9, pressure roller 178 is provided with annular grooves at 182 and 183 each with a width of about 1/32 inch and a uniform depth of about 1/64 inch, the center to center spacing between the grooves 182 and 183 corresponding to the specified width of tape 174, the width of the respective grooves 182 and 183 being sufficient to accommodate any tolerances in such width dimension of the tape 174, whereby contact between the pressure roller 178 and substantial marginal edge portions of the inactive surface of tape 174 is prevented. It has been found that the provision of such grooves greatly increases the useful life of magnetic tape cartridges operating in a video cartridge transducer machine such as illustrated in U.S. Pat. No. 4,020,999, and this embodiment is specifically incorporated as part of the disclosure herein. As indicated at 185, pressure roller 178 may be provided with a series of further grooves aligned with the respective slots such as 165 in capstan 167, so that the tape is not distorted or unduly worn by being pressed into the capstan slots. The portions of roller 178 above and below the tape may make good direct friction driving contact with the capstan 167 while the portions of roller 178 against the tape 174 make good friction driving contact with tape 174.

It will be understood, of course, that the transport systems herein may also be utilized with standard data tape recorders, for example such recorders with a seven parallel channel format, or with staggered heads of fourteen channel format.

Important advantages of each of the embodiments herein include good head wear characteristics, good head contact with the tape for high resolution and/or freedom from dropouts, and/or very high stability of drive motion and/or rapid starting and stopping of such tape motion, very little wear or mechanical distortion of the tape itself, and cleaning of the tape from dust and debris when a vacuum is used. The cleaning action takes place on the oxide side of the tape adjacent to the head where it is most effective in preventing dropouts. The gentle treatment of the tape is especially important with endless loop configurations where adjacent parts of the tape must slip against each other; our experiments have shown that the main cause of ultimate tape failure in endless cartridges is the wear and burnishing of tape surfaces by their slippage against capstans, guides, etc. Tape edge wear is particularly critical, and when pressure rolls were used the relief afforded by the arrangement of FIG. 9 extended the tape life by a factor of four or more. Low tape wear prevents noise, dropouts, and partial erasure from accumulating on tapes that are played many times.

The arrangement of FIG. 2, or of FIG. 8 with only a single capstan slot 165 is specifically disclosed and also as being utilized with one or more pressure rollers such as shown in FIG. 9, with or without the vacuum source being included.

Figure 10:
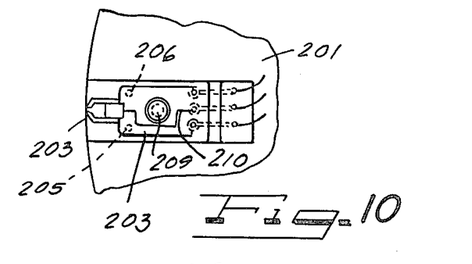
FIG. 10 is a partial somewhat diagrammatic plan view illustrating details of a removable head assembly for any of the embodiments herein.
Figure 11:
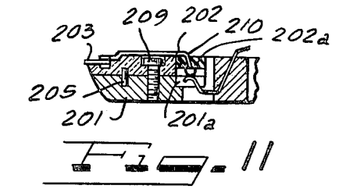
FIG. 11 is a partial somewhat diagrammatic vertical sectional view of the head arrangement of FIG. 10.

FIGS. 10 and 11 illustrate a replaceable head mounting for any of the embodiments herein. Thus, FIGS. 10 and 11 show a head mounting arm or body 201 which may correspond to the body 20c of FIG. 2, support 135 for head 142 in FIG. 6 or any of the head supports for heads such as 161-164 in FIG. 8. Support 201 carries an insert 202 which includes the head unit or units such as 203. Pins 205 and 206 carried by head support 201 fit into receiving apertures of insert 202 which may be closely fitted for fixed location, or may be slotted to allow adjustment of head protrusion, and a screw 209 removably secures the insert in place on the support 201. The conductors 210 leading from the head winding or windings are secured to contacts on an insulating block 202a of insert 202, and mate with corresponding contacts within a chamber 201a of the support 201, whereby the electric circuit to the head is automatically completed when the insert is fastened in place by means of screw 209.

Figure 12:
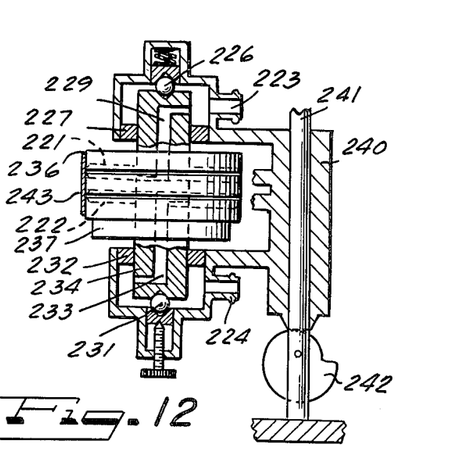
FIG. 12 is a somewhat diagrammatic vertical sectional view illustrating a further embodiment in accordance with the present invention.

FIG. 12 shows a form of capstan drive assembly which may be similar to those of the other embodiments herein except that the respective head chambers such as 221 and 222 may be connected to respective separate or semi-independent vacuum systems. Thus, passages 223 and 224 may lead to respective separate vacuum pump systems, each corresponding to that associated with passage 26 in FIG. 2. The bearing elements 226 and 227 are indicated as providing a chamber communicating with passage 223 and leading to a passage 229 within the capstan shaft 234, while lower bearing elements 231 and 232 provide a similar chamber in association with passage 224 which connects with a passage 233 within the capstan shaft 234. Each vacuum system alone can drive the tape if the other is accidently or purposely disabled. The capstan shaft is shown as being provided with integral capstan drive surfaces such as 236 and with a driven surface 237 which may couple with a belt or friction roller of the capstan drive train. Alternatively, shaft 234 may form part of an electric motor and flywheel drive as illustrated in FIG. 2. The transducer head assemblies may be supported from frame member 240 as in the embodiment of FIG. 2 or FIG. 8, or any of the other head configurations described herein may be utilized where the head is external to the capstan or engages the tape in advance of or beyond its contact with the capstan. Frame member 240 may be mounted firmly on a base or may be movable vertically along guide rods or ways 241 as by a cam 242 allowing the head position to be changed laterally with respect to a tape 243 guided along a fixed path. Driving surfaces as 236, 237 are wide enough to accommodate the desired vertical movement while supporting the tape, drive belt, etc.

In each of the vacuum operated capstan drive systems disclosed herein, the interior chambers are essentially sealed at all points exposed to atmosphere without requiring valves or the like to close off certain portions. They are therefore very economical of vacuum supply so that a compact inexpensive self-contained vacuum pump may be incorporated inside the record-playback unit.

The tape covers the capstan continuously over its contacting periphery so long as the tape record remains assembled with the record-playback unit. Thus, to stop the tape motion where no pressure rollers are used it is only necessary to interrupt the vacuum line and to connect the vacuum chamber to atmosphere via duct 65, as by means of solenoid valve 27, FIG. 2, whereupon the tape is decoupled from the capstan and comes to a stop even though the capstan may continue running.

In each of the embodiments herein, the capstan vacuum chamber or chambers communicate with the tape via continuous circular slots so as to hold the tape against the capstan in a driving relationship without introducing irregularities along the direction of movement of the tape. Longitudinally recorded material on a tape record medium is especially sensitive to disturbances in the longitudinal movement of the tape.

In a present working embodiment generally as shown in FIG. 2, the slot 16 has an axial dimension or width of about 0.040 inch, with the head centered in the slot. The slot can be much narrower if desired, since the present construction is very conservative and stronger than necessary. The tape contacting portion of the head core is four mils (0.004 inch) wide, so that relative shifting of the tape laterally provides for registration of the head with any one of about forty tracks spaced laterally along a one-fourth inch wide magnetic tape record medium.

In FIG. 2 a positive air pressure may be supplied to line 65 (positive pressure means), allowing the tape to pause or idle or even to be reverse driven while suspended on a layer of air that prevents wear of tape or capstan.

As illustrated in FIG. 2, in each of the embodiments, the web 20c of the head mount may have a thickness or axial extent much greater than the axial extent of the gap 16; also the outer edge of the web portion or neck on the side of the capstan remote from head 14 may have a greater axial extent than the web portion which actually carries head 14, to provide increased stiffness to the head mount, and to allow leads from the head to be brought through the web readily. The seal at 52', FIG. 4, may provide support for the reduced thickness neck portion 60 of the web. Where the vacuum is to be transmitted around neck portion 60 rather than via a passage 53, FIG. 4, the gap may be provided only in seal 51', for example, and not in seal 52', so that the vacuum duct would be present on only one side of neck portion 60.

Figure 13:
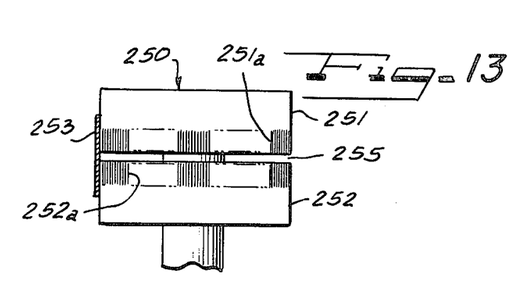
FIG. 13 is a partial somewhat diagrammatic side elevational view illustrating features of the capstan assembly applicable to any of the embodiments herein.

FIG. 13 illustrates a capstan 250 with drive surfaces 251 and 252 for driving engagement with a magnetic tape 253 in the region of a circular slot 255 which may be associated with any of the vacuum systems disclosed herein. The surfaces 251 and 252 are shown as providing tiny ducts such as indicated at 251a and 252a directed axially of the surfaces 251 and 252 and spaced about the periphery of the drive surfaces. The ducts communicate with the slot 255 so as to distribute the low pressure within the capstan chamber over a substantial portion of the width of the tape 253. The ducts such as 251a and 252a may be produced by knurling, grinding marks, serrations, sand blasted finish and the like so as to increase the area of the tape over which the air pressure acts and also to increase the coefficient of friction of the tape against the capstan drive surfaces 251 and 252, reducing any possible slippage. While the ducts 251a and 252a are shown as extending directly axially, the ducts could also have other patterns such as an oblique or herringbone or other pattern, all such patterns preferably being slight enough so as not to cause appreciable irregularity in tape motion. The main surface on which the tape rests between the ducts is an accurately concentric capstan surface. The edges of the drive surfaces 251 and 252 adjoining slot 255 may be slightly rounded inwardly to a reduced radius, or have a very small taper toward the slot 255, with or without the presence of the ducts, to increase the effective area of the air pressure. The pattern such as that shown in FIG. 13 can extend axially a distance less than the tape width as shown, or the pattern can extend somewhat beyond the tape edges. In the latter case, there may be capillary leakage which would have a small effect on the total vacuum that is to be maintained. The duct pattern as shown or described with reference to FIG. 13 may, of course, be applied to any of the tape contacting surfaces herein, and such modifications are specifically disclosed with respect to each of the embodiments shown in the drawings.

Figures 14, 16, 17, 18, 19:
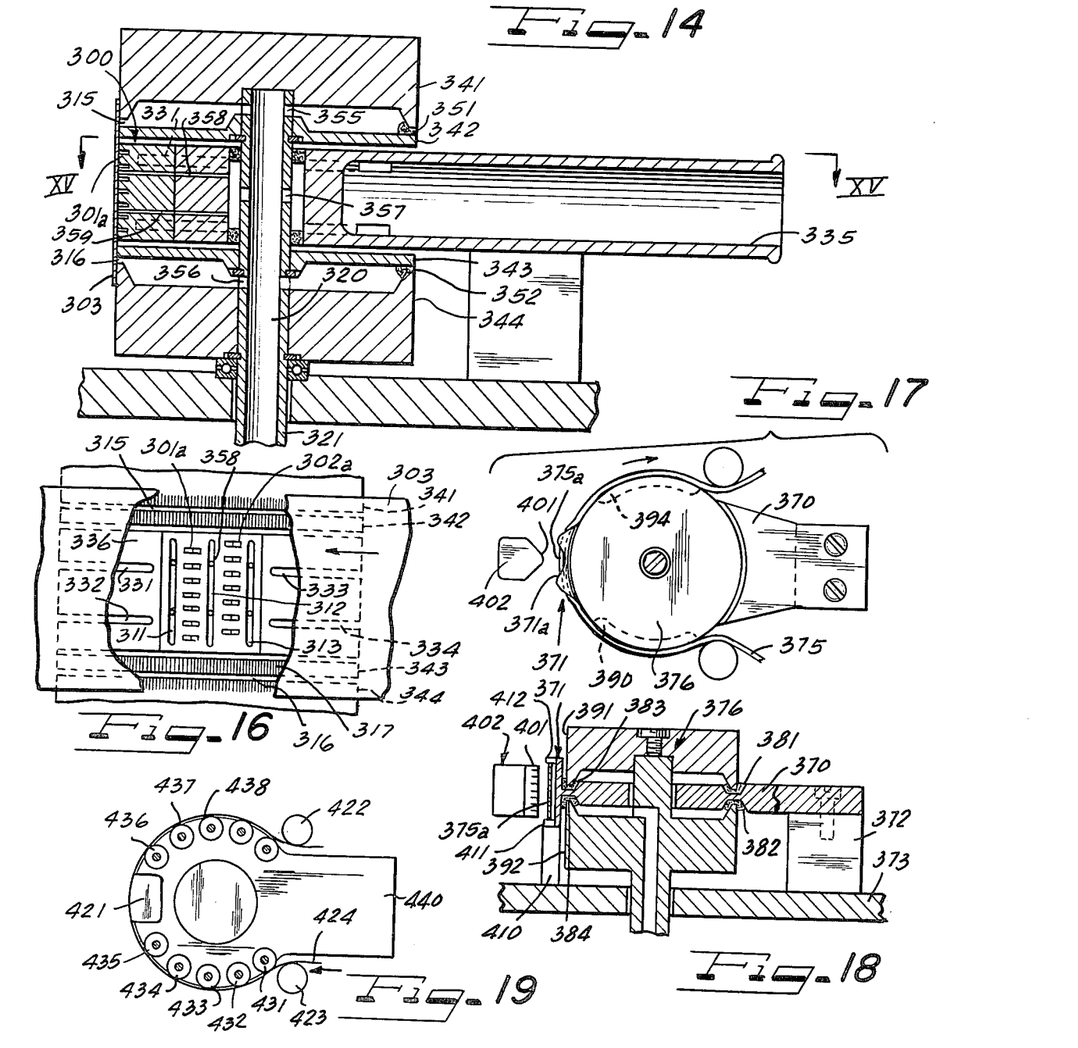
FIG. 14 is a partial somewhat diagrammatic vertical sectional view illustrating a capstan transducer system applicable to computer and data recording multiple track head assemblies.
FIG. 16 is a somewhat diagrammatic partial side elevational view of the head and capstan arrangement of FIGS. 14 and 15, and showing the tape broken away at the head assembly.
FIG. 17 is a somewhat diagrammatic plan view of a further embodiment for data and computer head assembly transducer systems.
FIG. 18 is a partial diagrammatic vertical sectional view of the system of FIG. 17.
FIG. 19 is a diagrammatic horizontal sectional view illustrating a further embodiment of transducer system in accordance with the present invention.
Figure 15:
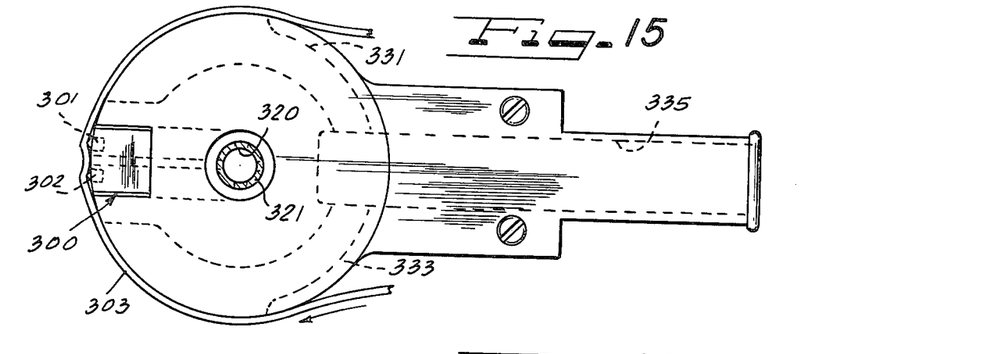
FIG. 15 is a somewhat diagrammatic plan view of the system of FIG. 14.

FIG. 14 is a vertical cross sectional view showing a transport arrangement accommodating relatively wide transducer head assemblies containing a multiplicity of head units. By way of example, head assembly 300 may be a seven track or fourteen track head assembly such as used in computers or data recorders. For the sake of specific example, FIG. 15 illustrates two sets of head units 301 and 302 which are in a staggered format so as to be in scanning relation to fourteen tracks on the magnetic tape record medium 303 passing thereacross. The tape 303 may be centered with respect to the head units as illustrated in FIG. 14, or the tape may be of increased width so as to accommodate multiple sets of tracks, for example a total of twenty-eight tracks.

FIG. 16 is a diagrammatic elevational view of the head assembly of FIGS. 14 and 15 showing tape 303 centered with respect to the head units such as 301a and 302a. FIG. 16 additionally shows vacuum distributor ducts 311–313 which serve to uniformally hold the tape 303 in conforming pressure contact. Also shown in FIG. 16 are vacuum slots 315 and 316 with axially directed distributor grooves adjacent thereto such as indicated at 317 which may conform with any of the embodiments described with reference to FIG. 13.

The vacuum system may be supplied via a bore 320 within capstan shaft 321, and thus the vacuum system may essentially conform with that shown in FIG. 2, for example.

Also illustrated in FIG. 16 are circumferentially extending pressure slots 331–334 which are supplied via a pressure manifold indicated at 335 in FIGS. 14 and 15. The slots 331–334 may receive air under a pressure greater than atmospheric pressure so as to minimize wear as tape 303 travels over the stationary supporting structure such as generally designated by reference numerals 336 in FIG. 16.

Referring to FIG. 14, it will be understood that the rotary cylindrical capstan parts 341–344 present an essentially cylindrical surface to the tape 303 as in the embodiment of FIG. 13, all of these parts being keyed or otherwise secured for unitary rotation with the capstan shaft 321. As in the embodiments of FIGS. 1–4, slots 315 and 316 are provided with suitable seals such as indicated at 351 and 352 in the regions of the slots not covered by the tape 303. The exact configuration of the seals such as 351 and 352 in relation to the entry and exit points of tape 303 relative to its conforming contact to the capstan cylindrical surfaces can be exactly as explained in reference to FIG. 1, for example.

It will be understood, of course, that as an alternative, the positive pressure slots such as 331–334 may be omitted, and the tape 303 may slide on the stationary parts designated 336 in FIG. 16 without any special provision of positive air pressure.

In FIGS. 14–16, multiple record or playback stations may be offset laterally from each other to cooperate with different channels, thus utilizing the full width of the tape.

As shown in FIG. 14, the vacuum passage 320 communicates with slots 315 and 316 via apertures such as 355 and 356, and communicates with head ducts 311–313, FIG. 16, via apertures such as 357 and radial bores such as 358 and 359.

FIGS. 17 and 18 illustrate a transducer assembly essentially similar to that of FIGS. 1–4 except that mounting member 370 carries a crescent guide assembly 371 externally of the vacuum slot, at the end of support 370 opposite its mounting 372 to frame member 373. Tape 375 is in engagement with capstan 376 over a substantial portion of the perimeter of the capstan as in the embodiment of FIG. 1, with the seals 381 and 382 provided at the mounting side as in the embodiment of FIGS. 1–4, and with similar seals 383 and 384 provided in the vacuum slot adjacent the crescent guide assembly 371 which in any event guides the tape 375 along a path as indicated at 375a which is somewhat spaced from the surface of capstan 376. As explained in detail in reference to FIG. 1, the vacuum slot is discontinued at a point such as indicated at 390 in advance of the point where the tape leaves engagement with the capstan cylindrical surfaces 391 and 392, the vacuum being reapplied beginning at a point such as indicated at 394 at a substantial angular distance beyond the point where the tape 375 has already returned into engagement with the cylindrical surfaces 391, 392.

By way of example, the crescent guide assembly 371 has a recess area 371a with a contour exactly complementary to the active face 401 of transducer head assembly 402 such that the face 401 may be pressed into sliding engagement with the active side of tape 375a as it moves across the recess 371a. With this configuration, the vacuum capstan of the present invention may be utilized with computer and data recorder head assemblies, for example with seven or fourteen tracks as described in reference to FIGS. 14–16, but the transducer head configuration may conform identically to the conventional configuration presently in extensive commercial use. Details of this general type of crescent guide assembly are found in reference to the second figure of my U.S. Pat. No. 3,725,608 dated Apr. 3, 1973, this type of guide having an air space behind the tape into which the tape at 375a may be deflected as the head is moved into pressure engagement with the tape, optionally such air space being filled with a resilient material. Also explained in the prior patent are suitable materials for the crescent guide assembly and for the capstan so as to avoid magnetic interferences due to any possible residual magnetization of the capstan. If desired, the crescent assembly 371 may be mounted to frame 373 by means of a bar such as indicated at 410 in FIG. 18. By way of example, a bar such as 410 may rigidly support each of the opposite ends of the crescent assembly 371 with respect to the direction of the record tape therethrough.

If desired, the crescent guide assembly may be provided with upper and lower flanges such as 411 and 412 for providing lateral guidance of the tape as it moves across the active face 401 of the head assembly 402 shown as being the fourteen track conventional type in FIG. 18.

FIG. 19 illustrates an alternative capstan transducer assembly utilizing a wide head 421 which may conform with the head assembly 300 of FIGS. 14–16. In this embodiment the head path conforms with that shown in FIGS. 15 and 17, for example, guide rollers being indicated at 422 and 423 for guiding the record tape 424 over the surfaces of successive idler rollers such as indicated at 431–438, for example. The surface defined by the tape contacting peripheries of rollers 431–438 conforms essentially with a cylindrical configuration, and the surface of head assembly 421 is essentially flush with such defined cylindrical surface so that the tape is in conforming pressure engagement with the head units of the head assembly 421. In this embodiment, tape 424 engages only the freely rotatable rollers such as 431–438, and the fixed mounting surface as 440 is entirely clear of the magnetic tape path; except that tape drive portions such as shown at 341, 342 and 343, 344 in FIGS. 14 and 16 may be arranged on each axial side of rollers such as 431–438, and may be driven by a common shaft such as 321 (not indicated in FIG. 19), the shaft being hollow as at 320 to produce a vacuum condition at head slits such as 311–313, FIG. 16, and at the annular capstan slots such as 315 and 316, FIG. 14, and associated distributor grooves such as 317. Also as described for FIG. 2, valve 27 may control selective supply of a vacuum or a positive pressure to the passageway 320 of shaft 321, FIG. 14, so that the positive pressure may be supplied to head slits 311–313 when the head assembly is not operative in either the embodiment of FIG. 16 or FIG. 19.

The rollers such as 431–438 in FIG. 19 may replace pressure slots 331–334 and structure 336, FIG. 16, as a means for reducing friction and wear along the tape path as shown at 303 in FIG. 15.

The vacuum capstan systems described here are especially advantageous for handling extra thin and delicate tapes such as triple-play and quadruple play tapes less than 0.001 inch thick, the overall thickness being 0.00025 to 0.00075 inch or less. Ordinary capstan drives handle these tapes only with extreme difficulty and likelihood of injury, so that such thin tapes have heretofore been impractical.

It will be apparent that many modifications and variations may be effected without departing from the scope and the novel concepts and teachings of the present invention.

I claim as my invention:

1. A tape transducer system comprising a driving capstan having a rotatable tape engaging capstan surface for driving engagement with an inner surface of a tape record medium wrapped on the capstan to produce uniform movement of the record medium substantially at a speed corresponding to the speed of said capstan surface, and having a capstan annular slot in said surface, stationary transducer head means in said annular slot and having a stationary coupling means at the capstan surface and at a fixed scanning location for coupling with a tape record medium as it is being driven by the capstan surface so as to transduce information between a recorded form on the record medium and a signal form at said transducer head means, and said transducer head stationary coupling means at said fixed scanning location scanning the tape record medium along a longitudinal track of the record medium and at a relative scanning speed substantially corresponding to the speed of said capstan surface, said annular slot in said capstan surface being of configuration to accommodate the transducer head stationary coupling means therein at said fixed scanning location and in scanning engagement with an inner surface of a tape record medium wrapped partially about the capstan, and said annular slot providing clearance between the capstan and said transducer head coupling means so that the capstan can be rotated while the transducer head coupling means is stationary in said annular slot, stationary slot obstructing means angularly offset from said fixed scanning location and extending in obstructing relation to portions of said annular slot remote from said stationary coupling means and which portions are not covered by a tape record medium wrapped on the capstan during operation and defining with said capstan an interior chamber in communication with the inner side of a tape record medium wrapped on the capstan in the vicinity of said stationary transducer head coupling means, such that during operation a substantial differential pressure can be established between the inner and outer sides of a tape record medium wrapped on said capstan, and a vacuum pump for communication with the interior chamber of the capstan for establishing said substantial differential pressure between the inner and outer sides of a tape record medium partially wrapped about said capstan and covering a part of the circumferential extent of said annular slot and such differential pressure being of a substantial magnitude over at least about one-half of the perimeter of said annular slot such that the tape record medium is held in an essentially non-slipping engagement with said capstan surface at both sides of said annular slot over at least about one-half of the perimeter of said annular slot at the part of the angular extent of said annular slot remote from said stationary slot obstructing means.

2. A tape transducer system according to claim 1 with said annular slot providing annular capstan surface portions on each axial side of said annular slot, and head support means extending through said slot means from the exterior of said capstan and supporting said transducer head means within the interior of said capstan.

3. A tape transducer system according to claim 1 with said capstan having a shaft mounting said capstan for rotation on its longitudinal axis, and head support means extending through said annular slot from the exterior of said capstan and past said shaft for supporting said transducer head means within the interior of said capstan.

4. A tape transducer system according to claim 1 with said capstan having a capstan shaft mounting said capstan for rotation on its longitudinal axis, said vacuum pump having an air passage means extending longitudinally in said shaft and communicating with said annular slot for producing a pressure less than atmospheric pressure at said annular slot and at the side of the tape record medium engaging said capstan surface.

5. a tape transducer system according to claim 1 with said capstan having a series of axially spaced annular slots and intervening tape engaging surface portions for driving engagement with a tape record medium extending about said capstan, said transducer head means comprising respective transducer head units in the respective slots with coupling means thereof disposed at the capstan surface for scanning engagement with respective longitudinal channels of a tape record medium.

6. A tape transducer system according to claim 1 with pressure roller means (178) disposed adjacent the capstan and operable to press the tape record medium into engagement with the surface of the capstan at opposite axial sides of the annular slot while being clear of the tape edges.

7. A tape transducer system according to claim 6 with said pressure roller means being of configuration to press the record medium against the capstan surface while being clear of the portion of the tape record medium overlying the annular slot.

8. A tape transducer system according to claim 1 with means defining a tape path for a tape record medium extending about the capstan and diverging from the capstan at a tape release location, said vacuum pump having means for connecting a vacuum source with said annular slot for tending to retain said tape record medium in engagement with the capstan, and said slot obstructing means including tape release means at the tape release location operable for assisting release of the tape record medium from the capstan in spite of said vacuum means.

* * * * *